(12) United States Patent
Murofushi (10) Patent No.: US 12,067,442 B2
(45) Date of Patent: Aug. 20, 2024

(54) READER APPARATUS, CONTROL METHOD, AND STORAGE MEDIUM

(71) Applicant: CANON KABUSHIKI KAISHA, Tokyo (JP)

(72) Inventor: Mitsuhide Murofushi, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 101 days.

(21) Appl. No.: 17/501,887

(22) Filed: Oct. 14, 2021

(65) Prior Publication Data

US 2022/0121831 A1  Apr. 21, 2022

(30) Foreign Application Priority Data

Oct. 21, 2020 (JP) ................. 2020-176923

(51) Int. Cl.
*G06K 7/10* (2006.01)
*G06K 7/00* (2006.01)

(52) U.S. Cl.
CPC ........ *G06K 7/10207* (2013.01); *G06K 7/0008* (2013.01); *G06K 7/10099* (2013.01)

(58) Field of Classification Search
CPC ............. G06K 7/10207; G06K 7/0008; G06K 7/10099
See application file for complete search history.

(56) References Cited

U.S. PATENT DOCUMENTS

| 8,830,703 | B2 | 9/2014 | Murofushi |
| 10,277,764 | B2 | 4/2019 | Kobayashi et al. |
| 10,944,327 | B2 | 3/2021 | Murofushi |
| 2007/0001816 | A1* | 1/2007 | Lindley ............... G06K 7/0008 340/10.34 |
| 2008/0231449 | A1* | 9/2008 | Moshfeghi ............ G08C 17/02 340/572.1 |
| 2018/0157872 | A1* | 6/2018 | Forster ................ G06K 7/0008 |

FOREIGN PATENT DOCUMENTS

| JP | 2005-252983 A | 9/2005 |
| JP | 2007-266936 A | 10/2007 |
| JP | 2018-121504 A | 8/2018 |

OTHER PUBLICATIONS

Japanese Office Action issued Apr. 9, 2024, during prosecution of related Japanese application No. 2020-176923 (English translation included).

* cited by examiner

*Primary Examiner* — James J Yang
(74) *Attorney, Agent, or Firm* — VENABLE LLP (57) ABSTRACT

A reader apparatus detects a communication object by radiating radio waves and receiving a response, determines a change in a state based on at least one of a position and an inclination of the reader apparatus, and controls power consumed in the reader apparatus by setting a length of a first period, in which a reduction of power consumed in the detection is not performed, and a length of a second period, in which a reduction of the power is performed, based on the change in the state.

14 Claims, 8 Drawing Sheets

READER APPARATUS, CONTROL METHOD, AND STORAGE MEDIUM

BACKGROUND OF THE INVENTION

Field of the Invention

The present invention relates to a technique for saving power of a reader apparatus for radiating radio waves and detecting a communication object.

Description of the Related Art

Systems for managing articles in distribution and inventory and managing animals by using passive RFID tags (hereinafter referred to as RFID tags) in the UHF band are widely used. RFID tags do not need to be equipped with a power supply such as a battery inside because they operate by radio waves radiated from the antenna of an MD reader as a source of power supply. Therefore. RFID tags can be manufactured to be thin and inexpensive. On the other hand, distances in which communication is possible between RFID tags and an RFID reader are short. Therefore, a fixed RFID reader cannot detect RFID tags over a wide range.

On the other hand, Japanese Patent Laid-Open No. 2007-266936 describes that an RFID reader is carried, and that the RFID reader detects RFID tags at a destination of movement to read information. Further, Japanese Patent Laid-Open No. 2007-266936 discloses that an RFID reader detects the position at which an RFID tag is read, stores the position information and the ID information of the RFID tag in association with each other, and executes an information reading process for RFID tags at the position at which information has not been read in the past. According to this configuration, the execution frequency of the information reading process is reduced, and power consumption by an RFID reader can be reduced.

In the method described in Japanese Patent Laid-Open No. 2007-266936, when the positions of RFID tags are not fixed, for example, an RFID tag for which information has been read is detected at an unregistered position. As a result, there may be cases where the power consumed by an RFID reader cannot be sufficiently reduced.

SUMMARY OF THE INVENTION

The present invention provides a technique for reducing the power consumed by an RFID reader.

According to one aspect of the present invention, there is provided a reader apparatus comprising: one or more processors; and one or more memories that store computer-readable instructions, which cause, when executed by the one or more processors, the reader apparatus to: detect a communication object by radiating radio waves and receiving a response; determine a change in a state based on at least one of a position and an inclination of the reader apparatus; and control power consumed in the reader apparatus by setting a length of a first period, in which a reduction of power consumed in the detection is not performed, and a length of a second period, in which a reduction of the power is performed, based on the change in the state.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

In the present embodiment, a system in which a portable RFID reader detects RFID tags arranged over a wide range will be described. This RFID reader reduces power consumption by reducing consumed power according to the status. In particular, in the present embodiment, the RFID reader sets the length of the period in which it should be operated with low power consumption in accordance with the status such as changes in its position and orientation. For example, the operation period at low power consumption is lengthened so as not to unnecessarily consume power in a state where the amount of change in the status of the RFID reader is small, and the operation period at low power consumption is shortened in a state where the amount of change in the status of RFID reader is large. In the following, a description focusing on the configuration and operation of such an RFID reader will be given.

(Apparatus Configuration)

Figure 1:
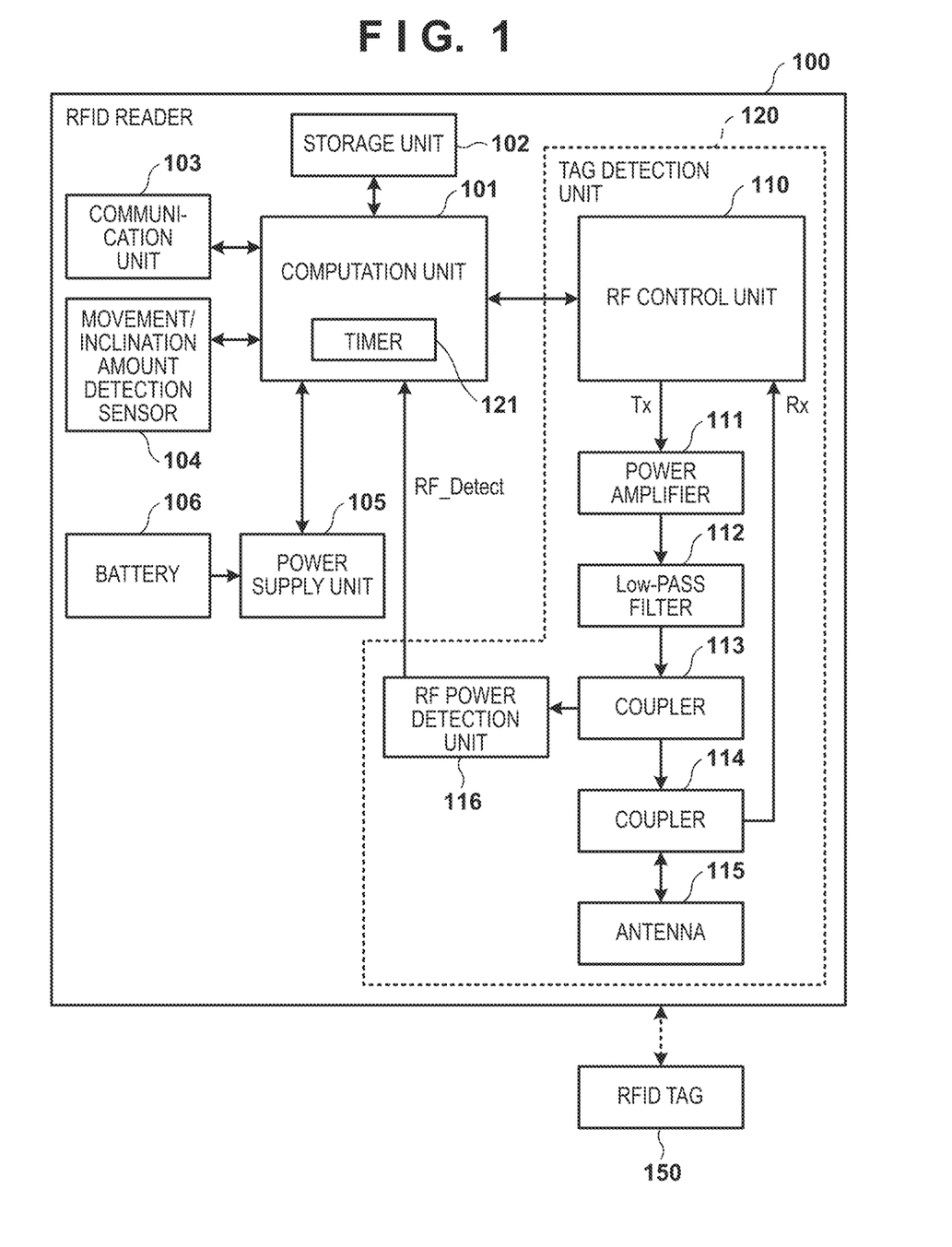
FIG. 1 is a diagram illustrating an exemplary configuration of an RFID reader.
Figure 2A:
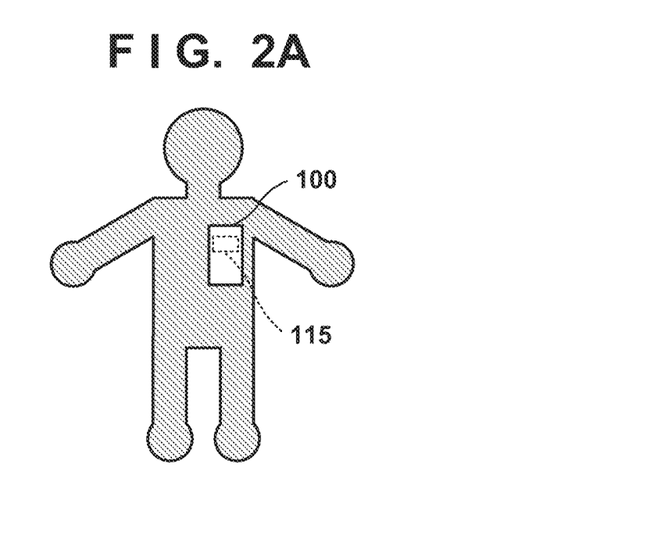
FIGS. 2A to 2C are diagrams for explaining examples of moving bodies carrying RFID readers.
Figure 2B:
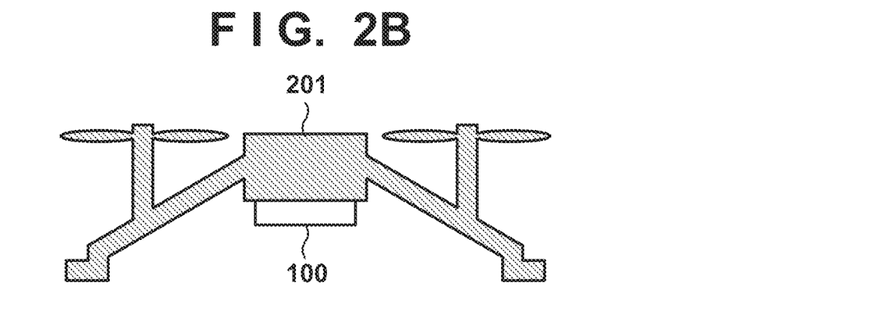
Figure 2C:
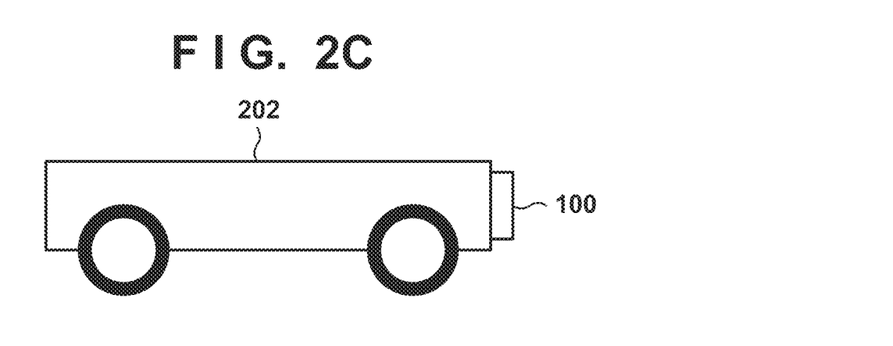

FIG. 1 illustrates an exemplary configuration of an RFID reader 100. The RFID reader 100 is transported by a moving body such as a human, an animal, a machine, or the like, and is configured to detect RFID tags 150, which are present over a wide range, as the moving body moves. Incidentally, the RFID tags 150 operate with radio waves radiated from an antenna 115 of the RFID reader 100 as a source of power supply. That is, the RFID reader 100 supplies electromagnetic waves in the UHF band to an RFID tag 150, operates an IC chip (not illustrated) inside the RFID tag 150 using that electromagnetic wave, and reads the ID information saved in the storage unit of the RFID tag 150. The RFID reader 100 can detect an RFID tag 150 by sufficiently approaching (to a range of several meters of) the RFID tag 150 and performs such radio communication with the RFID tag 150. The RFID reader 100, in one example, can be carried by a person (animal) wearing it as illustrated in FIG. 2A. The RFID reader 100 may also be transported by being attached to a moveable machine such as a drone 201 or an automated guided vehicle 202 as illustrated in FIG. 2B and FIG. 2C.

The RFID reader 100 is configured to include, for example, a computation unit 101, a storage unit 102, a communication unit 103, a movement/inclination amount detection sensor 104, a power supply unit 105, and a battery 106.

The computation unit 101 controls the entire operation of the RFID reader 100. The computation unit 101 executes, for example, a computer program stored in the storage unit 102 so that the RFID reader 100 executes operations described. later and operations as a general RFID reader. The computation unit 101 is configured to include one or more processors and processing circuits such as a. central processing unit (CPU), a microprocessor, an application-specific integrated circuit (ASIC), and a field programmable gate array (FPGA). The storage unit 102 holds programs and data for executing these operations. The storage unit 102 is configured to include, for example, one or more memories such as a ROM (Read Only Memory), and a RAM (Random Access Memory) for temporarily holding information, or at least one of other storage media such as a hard disk. Note that the computation unit 101 and the storage unit 102 may he integrated, and for example, a single chip microcomputer may be used.

The communication unit 103 communicates with an external apparatus that differs from the RFID reader 100 by a communication method different from RFID, for example. For example, the communication unit 103 may be configured to he able to communicate using a cellular communication system or a wireless LAN communication system. The movement/inclination amount detection sensor 104 is a sensor for detecting at least one of the movement amount and the inclination amount of the RFID reader 100, and is configured to include, for example, a three-axis acceleration sensor, a gyro sensor, a geomagnetic sensor, or the like. The power supply unit 105 is connected to the battery 106, such as a rechargeable and reusable secondary battery, and supplies each functional portion of the RFID reader 100 with power provided by the battery 106. The power supply unit 105 is configured by a circuit including, for example, a DCDC converter or the like, and is configured to be able to execute power supply control based on the control of the computation unit 101, for example.

A tag detection unit 120 is controlled by the computation unit 101, and performs a detection process of an RFID tag 150. The tag detection unit 120 has, for example, an RF control unit 110, a power amplifier 111, a Low-pass filter 112, a first coupler 113, a second coupler 114, the antenna 115, and an RF power detection unit 116. The RF control unit 110 outputs an RF (radio frequency) waveform in the UHF band from a Tx terminal. The RF waveform is amplified at the power amplifier 111, and subsequently, components in unwanted frequency bands are removed from the amplified waveform by the Low-pass filter 112. The waveform from which components in unwanted frequency bands have been cut is inputted to the first coupler 113. Note that the power of the RF waveform is variable and can be set by the computation unit 101. The RF power detection unit 116 monitors the first coupler 113 to detect the power of the RF waveform in the first coupler 113. The RF power detection unit 116 inputs the result of detection of the power to the computation unit 101 as an RF_Detect signal, and by this RF_Detect signal, the computation unit 101 can detect that the power of the RF waveform has been inputted to the first coupler 113. The second coupler 114 outputs an RF waveform to the antenna 115. Also, the second coupler 114 receives the RF signal received from an external unit by the antenna 115, and inputs that inputted signal to the RF control unit 110. For example, the RF control unit 110 may acquire ID information from an RFID tag 150 via, the antenna 115 and the second coupler 114. The antenna 115 outputs electromagnetic waves in the UHF band and supplies power by irradiating those electromagnetic waves to an RFID tag 150. Then, the antenna 115 transmits and receives signals using electromagnetic waves to and from the RFID tag 150, which is the target of irradiation of electromagnetic waves. Incidentally, irradiation of electromagnetic waves onto an RFID tag 150 may be referred to as radio wave irradiation below.

Figure 4:
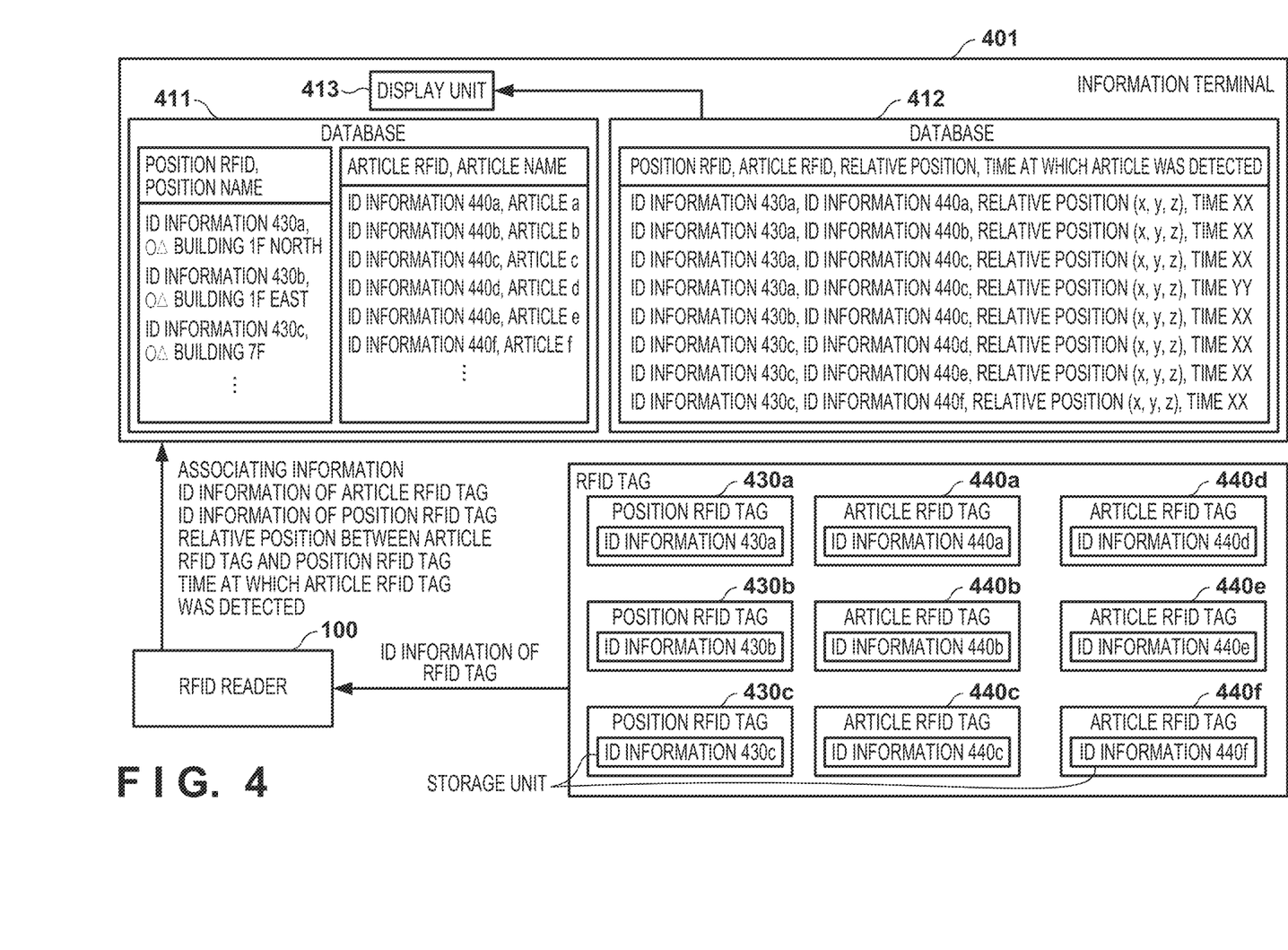
FIG. 4 is a diagram for explaining a position detection system of the RFID reader.

In the present embodiment, the RFID reader 100 detects the information of the relative position to and from an RFID tag using the movement/inclination amount detection sensor 104 while automatically detecting the ID information of the RFID tag, as will be described later with reference to FIG. 4. The RFID reader 100 uses the ID information of a plurality of RFID tags in association with the information of the relative position between the plurality of RFID tags. For this reason, the computation unit 101 saves the ID information of an RFID tag 150 that the RF control unit 110 detected and the information of the movement amount detected by the movement/inclination amount detection sensor 104 in the storage unit 102. and performs required data processing. Thereafter, the computation unit 101 performs communication with an information terminal 401, which will be described later with reference to FIG. 4, via the communication unit 103. In one example, the RFID reader 100 may be configured to collect a predetermined amount of the above-described pieces of information in the storage unit 102, and then communicate with the information terminal 401 via the communication unit 103. According to such a configuration, the frequency of communication with the information terminal 401 can be reduced, and the power consumed by the RFID reader 100 can be reduced. Further, according to this configuration, when the RFID reader 100 cannot communicate with the information terminal 401, information can be temporarily saved in the storage unit 102.

Figure 5:
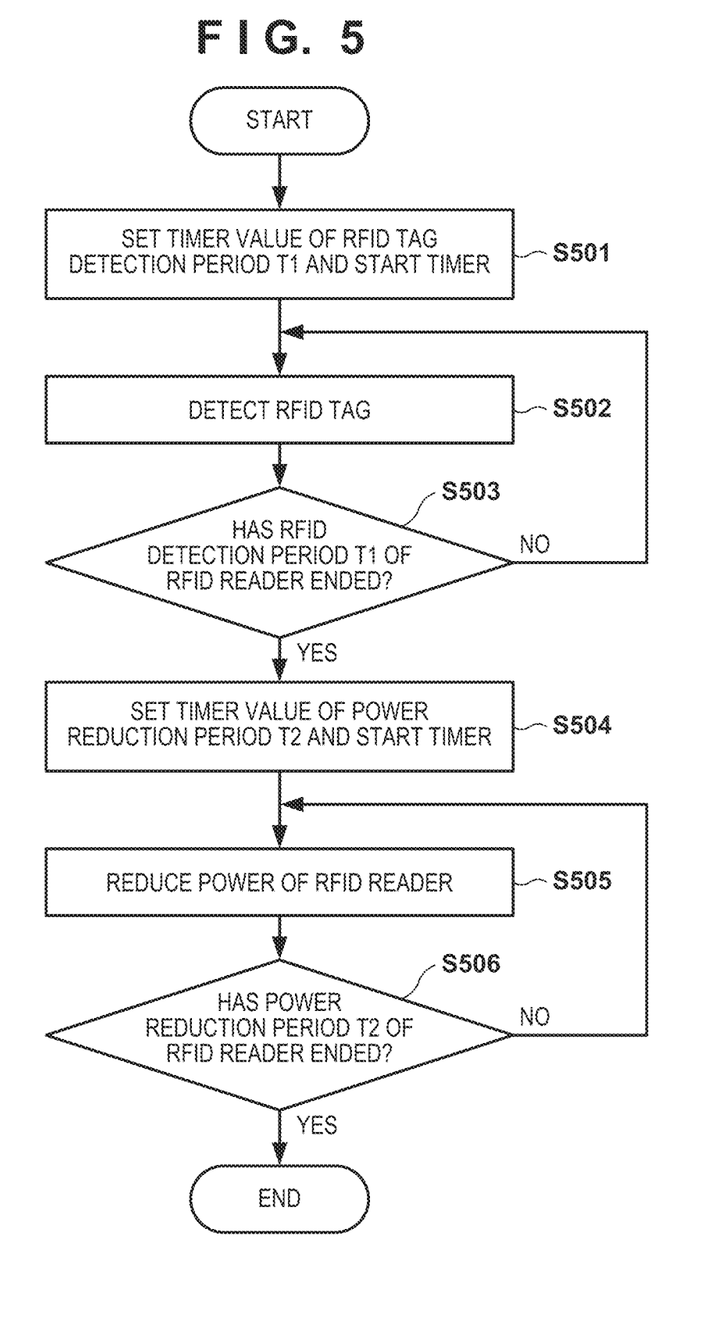
FIG. 5 is a diagram illustrating an exemplary flow of a process executed by the RFID reader.

In one example, the computation unit 101 executes reading of an RFID tag 150, computation control to be described later with reference to FIG. 5, and control for switching to a power reduction operation of the RFID reader 100 to be described later with reference to FIG. 6. The computation unit 101 has a timer 121 for setting an operation period of the RFID reader 100, and can simultaneously count a plurality of durations, such as a timer for time or a timer for determining the elapse of a predetermined period, using the timer 121. In addition, the computation unit 101 saves, in the storage unit 102, a setting value of the timer 121 for setting the operation period of the RFID reader 100 and the position information and the inclination (state of orientation) information of the MID reader 100.

Figure 3A:
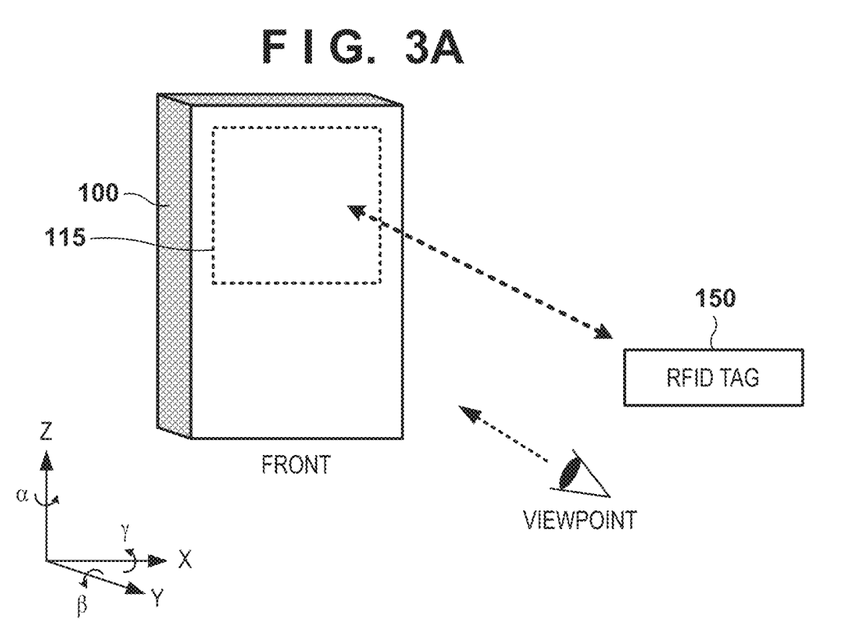
FIGS. 3A and 3B are external explanatory diagrams of an RFID reader.
Figure 3B:
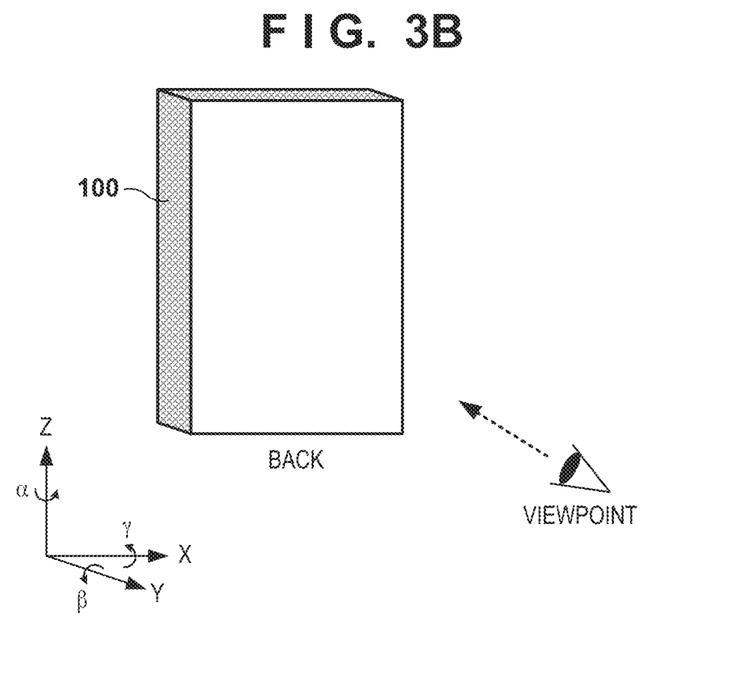

FIGS. 3A and 3B are diagrams describing an example of an appearance of the RFID reader 100. FIG. 3A is an appearance of the front of the RFID reader 100. Also, FIG. 3B is an appearance of the back of the RFID reader 100. In FIG. 3A, the position of the antenna 115 of the RFID reader 100 is indicated by dashed lines. The movement and inclination amounts of the RFID reader 100 are indicated by the movement amounts in the X-Y-Z-axis directions and the rotation angles in the $\alpha$-$\beta$-$\gamma$ directions, and the movement/inclination amount detection sensor 104 detects these amounts. Incidentally, $\alpha$ is a rotation angle about the Z-axis, $\beta$ is a rotation angle about the Y-axis, $\gamma$ is a rotation angle about the X-axis.

In one example, the direction of movement of the RFID reader 100 is defined as movement in the right direction when movement is made in the direction of the arrow of the X-axis and as movement in the left direction when movement is made in a direction opposite to the arrow of the X-axis when viewed from the viewpoint of FIG. 3A. Further, the case where movement is made in the direction of the arrow of the Y-axis in FIG. 3A is defined as movement in the front direction, and the case where movement is made in the direction opposite to the arrow of the Y-axis is defined as movement in the rear direction. Further, the case where movement is made in the direction of the arrow of the Z-axis in FIG. 3A is defined as movement in the upward direction, and the case where movement is made in the direction opposite to the arrow of the Z-axis is defined as movement in the downward direction. Note that the antenna 115 of the RFID reader 100 may have, in one example, a characteristic of strongly irradiating radio waves in the front direction of FIG. 3A. In this case, the front direction is called the direction of radio wave irradiation.

In addition, in one example, regarding the inclination state of the RFID reader 100, a state in which the rotational angle α is 180° in the direction of the arrow (or the direction opposite to the arrow) when viewed from the viewpoint of FIG. 3A is defined as a state in which the RFID reader 100 is facing back. As one example, FIG. 3B illustrates a state in which the rotational angle α is 180° and the RFID reader 100 is facing back. Further, a state in which the rotation angle β is a value in the range from the state of FIG. 3A up to 180° in the direction of the arrow is defined as a state in which inclination is leftward, and a state in which the rotation angle β is a value in the range from the state of FIG. 3A up to 180° in the direction opposite to the arrow of the rotation angle β is defined as a state in which inclination is rightward. Further, a state in which the rotation angle γ is 90° from the state of FIG. 3A in the direction of the arrow is defined as a state in which facing is up, and a state in which the rotation angle γ is 90° from the state of FIG. 3A in the direction opposite to the arrow is defined as a state in which facing is down.

Next, an article position detection system according to the present embodiment will be described with reference to FIG. 4. In this system, as one example, the RFID tags 150 are classified into position RFID tags 430a, 430b, 430c and so on, which are used to detect a reference position, and article RFID tags 440a, 440b, and so on, which are attached to articles to be managed. The RFID reader 100 transmits, to the information terminal 401, information in which the ID information of a detected article RFID tag 440 and a position RFID tag 430 are associated with the information of the relative position (x, y, z) of the article RFID tag 440 and the position RFID tag 430. Further, the RFID reader 100 may transmit information of the time that it detected an RFID tag 150 to the information terminal 401. Note that, for example, the information terminal 401 may measure the time at which it acquired information from the RFID reader 100 using an internal clock, and hold that measured time. The RFID reader 100 transmits information to the information terminal 401 using, for example, the communication unit 103.

The information terminal 401 is configured to include a database 411, a database 412, and a display unit 413. The information terminal 401 may be, for example, a smartphone, a PC, or the like. The database 411 holds data in which the ID information of the position RFIDs 430 is associated with position names, and data in which the ID information of the article RFIDs 440 is associated with article names. Here, the ID information of RFID tags is difficult for the user to recognize because it can be a complex character string. For this reason, in the information terminal 401, when the information is displayed on the display unit 413, for example, the ID information is converted to the positions or the names of the articles based on the database 411, and these names are displayed. Note that the ID information of RFIDs may be displayed as is on the display unit 413 without using the database 411. The database 412 saves data in which the ID information of the position RFID tags 430 and the article RFID tags 440, the relative positions of the position RFID tags 430 and the article RFID tags 440, and the times at which the article RFID tags 440 were detected are associated. As described above, the information terminal 401 receives these pieces of information from the RFID reader 100 and stores these in the database 412. The display unit 413 displays the position information of a specified article by referencing of the database 412 based on a user instruction received via an interface (not illustrated) of the information terminal 401.

Note that the configuration of the position detection system is an example, and the RFID reader 100 may be included in the information terminal 401, for example. In this case, the information terminal 401 can execute various processing such as collecting the above-described information via the built-in RFID reader 100 and presenting information with which to notify the user of the position of an article, for example. Further, a system that uses article RFID tags and position RFID tags is only one example, and for example, configuration may be taken such that the RFID reader 100 is an apparatus that can specify its position and the information of a detected RFID tag 150 is notified to the information terminal 401 together with its position.

(Processing Flow)

Next, an example of a flow of processing executed by the RFID reader 100 will be described. FIG. 5 illustrates an exemplary flow of processing for switching between a period in which the RFID reader 100 executes the detection processing of an RFID tag 150 and a period of power reduction without the execution of such detection processing. This process can he realized by, for example, the computation unit 101 of the RFID reader 100 executing a program stored in the storage unit 102 in response to the power of the RFID reader 100 entering an ON state. Note that in the following, a description of a case where the computation unit 101 executes processing using the timer 121 will be given, but this is only one example, and the following processing may be executed by one or more arbitrary functional units included in the RFID reader 100.

In this process, the computation unit 101 first sets the timer 121 for measuring a period T1 for detecting RFID tags 150 (consuming sufficiently large power), and starts measuring the period T1 (step S501). The computation unit 101 reads out a timer setting value of the period T1 from the storage unit 102, for example, and performs setting of the timer 121. The timer 121 is constantly counting in the computation unit 101, for example, and can measure from the set point in time until a predetermined period (here, the period T1) elapses. It should be noted that this is an example, and the timer 121 may start measuring in response to the setting of the period T1, and may be any type of timer that enables the determination of whether or not the set period has elapsed. Note that immediately after the power of the RFID reader 100 is turned on, the computation unit 101 may set the timer 121 to an initial value of the period T1 stored in a ROM (not illustrated) or the like provided inside the computation unit 101, for example. Next, the computation unit 101 performs setting for the RFID reader 100 to detect an RFID tag 150, and executes detection of an RFID tag 150 based on that setting (step S502). Then, the computation unit 101 determines whether or not the period T1 for detecting RFID tags 150 for which measurement has been started in step S501 has elapsed by checking the timer 121 (step S503). The computation unit 101 repeatedly executes the detection processing of an RFID tag 150 (step S502) while the period T1 has not elapsed (NO in step S503), and when it is determined that the period T1 has elapsed (YES in step S503), advances the processing to step S504.

In step S504, the computation unit 101 sets the timer 121 for the measurement of a period T2 in which power consumption is reduced (hereinafter, referred to as "power reduction period") and starts measurement of the period T2. The computation unit 101 reads out a timer setting value of the period T2 from the storage unit 102, for example, and performs setting of the timer 121. Subsequently, the computation unit 101 performs setting that is related to a state in which power is reduced (hereinafter referred to as "power reduction state") and executes operation in the power reduction state based on the setting (step S505).

In the power reduction state, the computation unit 101 controls the power supply unit 105 to reduce the consumption of power stored in the battery 106. The power reduction state is a state in which the strength of electromagnetic waves outputted from the RFID reader 100 is reduced by the RF control unit 110 reducing the amplitude of the RF waveform from the Tx terminal or reducing the amplification factor of the power amplifier 111 based on the control of the computation unit 101, for example. It should be noted that the RFID reader 100 may stop outputting radio waves in the power reduction state. Further, for example, in addition to this, in the power reduction state, consumed power may be further reduced by lowering or stopping the operation clock of the computation unit 101 and the storage unit 102 and causing these functional units to go into sleep mode. Furthermore, it is also possible to further reduce consumed power by stopping the operation of the communication unit 103 and the RF power detection unit 116.

Then, the computation unit 101 determines whether or not the period T2 for which measurement has been started in step S504 has elapsed by checking the timer 121 (step S506). The computation unit 101 maintains the power reduction state (step S505) while the period T2 has not elapsed (NO in step S506), and ends the process when it determines that the period T2 has elapsed (YES in step S506). Note that the computation unit 101 may repeatedly execute the processing of FIG. 5. That is, the computation unit 101 may return the process to step S501 after the period T2 has elapsed set the period T1 and the period T2 again, and operate while alternately switching between the state in which RFID tags 150 are detected and the power reduction state.

In the present embodiment, the RFID reader 100 controls the duration of the period T1 and the period T2 in accordance with its amount of movement and the like. For example, when it is expected that there will be no (or a small enough) change in position or the like of the RFID reader 100 and that there is also no change in the RFID tags 150 to be detected, the RFID reader 100 sets the period T2 to be relatively long and sets the period T1 to be relatively short so as to sufficiently reduce consumed power. On the other hand, when it is expected that there will be a change in position or the like of the RFID reader 100 and that there will also be a change in the RFID tags 150 to be detected, the RFID reader 100 sets the period T1 to be relatively long and sets the period T2 to be relatively short so as to prevent omission in the detection of RFID tags 150 in its periphery. As a result, the RFID reader 100 can reliably detect RFID tags 150 while reducing consumed power.

The computation unit 101 decides and sets the durations of the period T1 and the period T2 according to the procedure described below. The computation unit 101 may update the period T1 and the period T2 in response to detection of a change in the status such as an increase or a decrease in the movement amount of the apparatus, for example. This update may be performed only during the period T1, only during the period T2, or regardless of the period.

When the update is performed only during the period T1, the length of the period T1 can be newly set by the computation unit 101 while the timer 121 measures the period T1 in accordance with the length of the period T1 set in advance. In this case, the timer 121 may measure the period T1 with the updated length. In one example, if a duration t11 has elapsed from the start of the measurement of the period T1 at the point in time when the computation unit 101 has newly set a length t10 of the period T1, the RFID reader 100 may transition to the period T2 after the period whose length is t10-t11 has elapsed. Further, if t11 is greater than t10, in other words, if, at the point in time when the length of the period T1 has been updated, a period of that length had elapsed, transition may be immediately made to the period T2. Similarly, when the update is performed only during the period T2, the length of the period T2 can be newly set by the computation unit 101 while the timer 121 measures the period T2 in accordance with the length of the period T2 set in advance. In this case, the timer 121 may measure the period T2 with the updated length. In one example, if a duration t21 has elapsed from the start of the measurement of the period T2 at the point in time when the computation unit 101 has newly set a length t20 of the period T2, the RFID reader 100 may transition to the period T1 after the period whose length is t20-t21 has elapsed. Further, if t21 is greater than t20, in other words, if, at the point in time when the length of the period T2 has been updated, a period of that length had elapsed, transition may be immediately made to the period T1.

Also, in another example, the length of the updated period T1 decided by the computation unit 101 in the period T1 is not applied to the period T1 at that point in time, but may be applied from the next period T1. Similarly, the length of the updated period T2 decided by the computation unit 101 in the period T2 is not applied to the period T2 at that point in time, but may be applied from the next period T2. Note that regarding the other period, the setting is changed during a period in which the lengths of the period T1 and the period T2 are decided by the computation unit 101. As a result, the other period is measured by the updated length.

When the update is performed regardless of the period, the above-described processing when the update is performed during the period T1 and the above-described processing when the update is performed during the period T2 can be selectively executed according to the timing when the update is performed.

Note that in the case where the computation unit 101 is transitioned to the sleep mode and the calculation processing is stopped in the period T2, a case where the computation unit 101 cannot process the result (decide the period T1 or the period T2) immediately after the detection result of the movement amount or the like has been obtained is expected. In this case, for example, information such as the detected movement amount may be saved in a memory (not illustrated) provided in the movement/inclination amount detection sensor 104 or the like, and the computation unit 101 may set the durations of the period T1 and the period T2 based on these pieces of information in the period T1.

Next, an example of a procedure for setting the period T1 and the period T2 will be described. Note that although this processing is described below as being executed by the computation unit 101 of the RFID reader 100, this is only an example, and this processing may be executed by another functional unit configured to execute the following processing.

Processing Example 1

Figure 6:
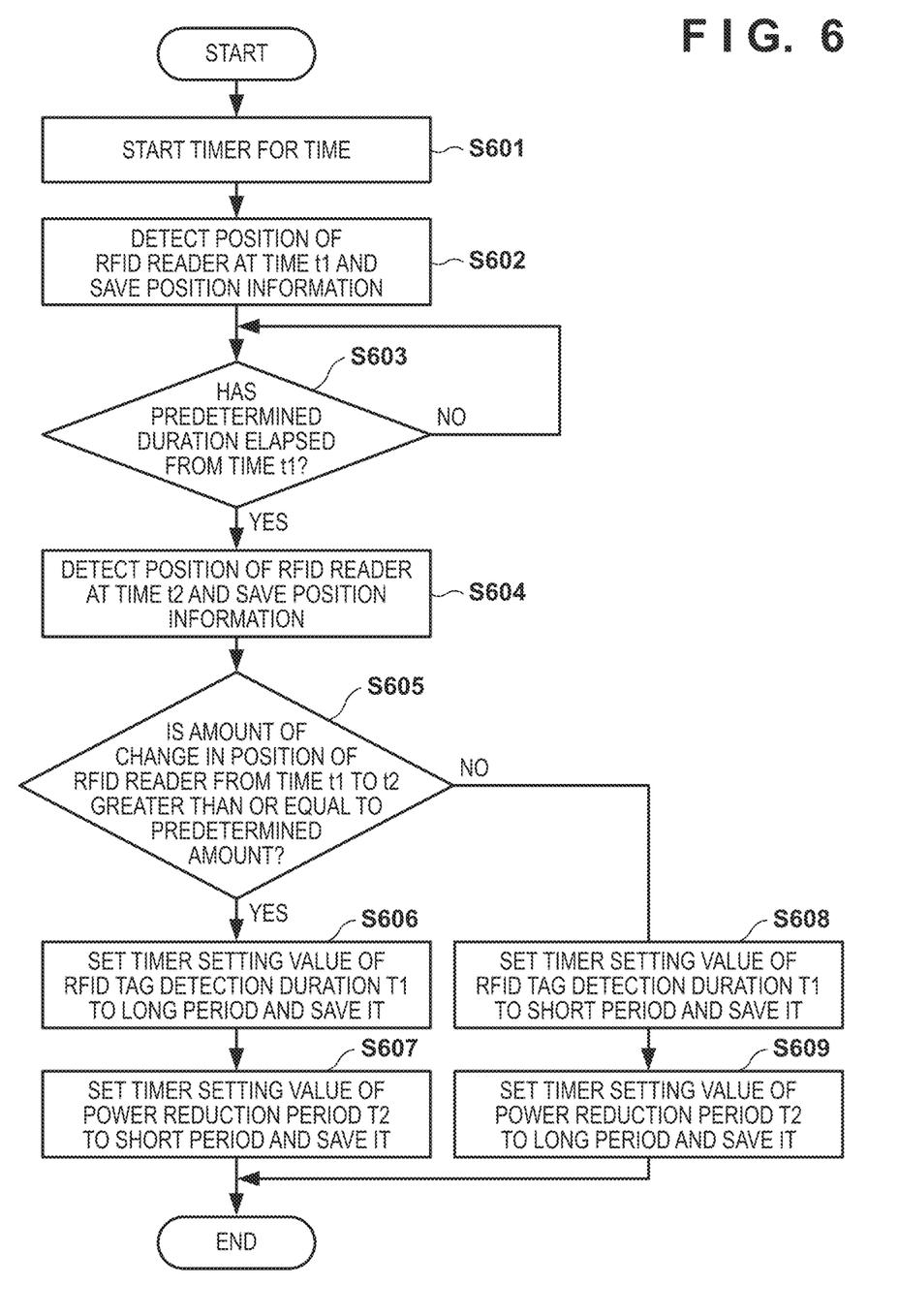
FIG. 6 is a diagram illustrating an exemplary flow of a process executed by the RFID reader.

FIG. 6 illustrates a first example of the flow of the procedure for setting the period T1 and the period T2. FIG. 6 illustrates an example of a procedure in which the RFID reader 100 sets the length of the period T1 and the length of the period T2 in accordance with the amount of change in position (i.e., movement amount). In the procedure of FIG. 6, the computation unit 101 first sets the timer 121 so as to operate as a timer for time, which is for performing measurement for specifying the timing at which to measure the position, and starts measuring time (step S601). The computation unit 101 causes the movement/inclination amount detection sensor 104 to detects the position of the RFID reader 100 in response to the timer for time reaching time t1, and acquires the detection result (step S602). The computation unit 101 saves the position information in the storage unit 102. Thereafter, when a predetermined duration has elapsed from time t1 by the timer 121 and the timer for time reaches time t2 (YES in step S603), the computation unit 101 causes the movement inclination amount detection sensor 104 to detect the position of the RFID reader 100 again, and acquires the detection result (step S602). The computation unit 101 saves the position information in the storage unit 102. Note that the position of the RFID reader 100 at the time of detection can be represented by, for example, the position information of the relative position with respect to the position RFID tag 430 detected at time t1. For example, the position information at time t1 can be expressed as relative position coordinates (x1, y1, z1), and the position information at time t2 can be expressed as relative position coordinates (x2, y2, z2). Note that these position coordinates may be expressed in a format that is not a relative position with respect to the position RFID tag 430.

Then, the computation unit 101 reads out the position information at time t1 and time t2 from the storage unit 102, and determines whether or not the amount of change in position of the RFID reader 100 between time t1 and time t2 is equal to or greater than a predetermined amount (step S605). Note that the amount of change in position of the RFID reader 100 between time t1 and time t2 is calculated as:

$$\text{Amount of change in position} = (x2-x1)^2 + (y2-y1)^2 + (z2-x1)^2$$

Also, the amount of change in position of the RFID reader 100 from time t1 to time t2 may be calculated as the absolute value of the differences between the respective coordinate axes as follows.

$$\Delta x = |x2-x1|, \Delta y = |y2-y1|, \Delta z = |z2-z1|$$

When the amount of change in position is equal to or larger than the predetermined amount (YES in step S605), the computation unit 101 determines that the movement speed of the RFID reader 100 is fast. In this instance, the computation unit 101 sets the timer setting value of the period T1 for detecting RFID tags 150 to a long period so as to avoid omission in the detection of RFID tags 150 that are present in the periphery of the RFID reader 100, and saves the setting value in the storage unit 102 (step S606). In addition, the computation unit 101 sets the timer setting value of the period T2, in which the power of the RFID reader 100 is reduced, to a short period and saves the setting value in the storage unit 102 (step S607).

On the other hand, when the amount of change in position is less than the predetermined amount (NO in step S605), the computation unit 101 determines that the movement speed of the RFID reader 100 is slow. In this instance, even if the period T2 is lengthened, omission in the detection of RFID tags 150 is unlikely to occur, so the computation unit 101 sets the timer setting value of the period T1 for detecting RFID tags 150 to a short period, and saves the setting value in the storage unit 102 (step S608). In addition, the computation unit 101 sets the timer setting value of the period T2, in which the power of the RFID reader 100 is reduced, to a long period and saves the setting value in the storage unit 102 (step S609).

It is assumed that the RFID reader 100 is mostly stopped when the amount of change in position (movement amount) is small. Therefore, when this amount of change in position is small, there is a low possibility that omission in the detection of RFID tags 150 will occur, so the RFID reader 100 reduces the strength of electromagnetic waves to be outputted, for example. According to this configuration, the RFID reader 100 can reduce the frequency at which the RFID tags 150 are read, and can sufficiently reduce consumed power. On the other hand, when the amount of change in position is large, it is assumed that the RFID reader 100 is moving fast, and therefore, in order to prevent omission in the detection of RFID tags, the RFID reader 100 increases, for example, the strength of electromagnetic waves to be outputted. As a result, the RFID reader 100 can increase the frequency at which the RFID tags 150 are read, and can detect RFID tags 150 that are present in the periphery with high accuracy.

According to the control procedures of FIG. 6, even when the positions of RFID tags 150 detected in the past have been changed, the power consumed can be reduced in accordance with the state of the RFID reader 100 independent of the positions of RFID tags 150. Further, according to the control procedures of FIG. 6, since the position information of RFID tags 150 detected in the past is not required, there is no need to perform communication in order to inquire the information terminal 401 about the past position information of RFID tags 150. Therefore, the RFID reader 100 can reduce consumed power necessary for communication.

Processing Example 2

Figure 7:
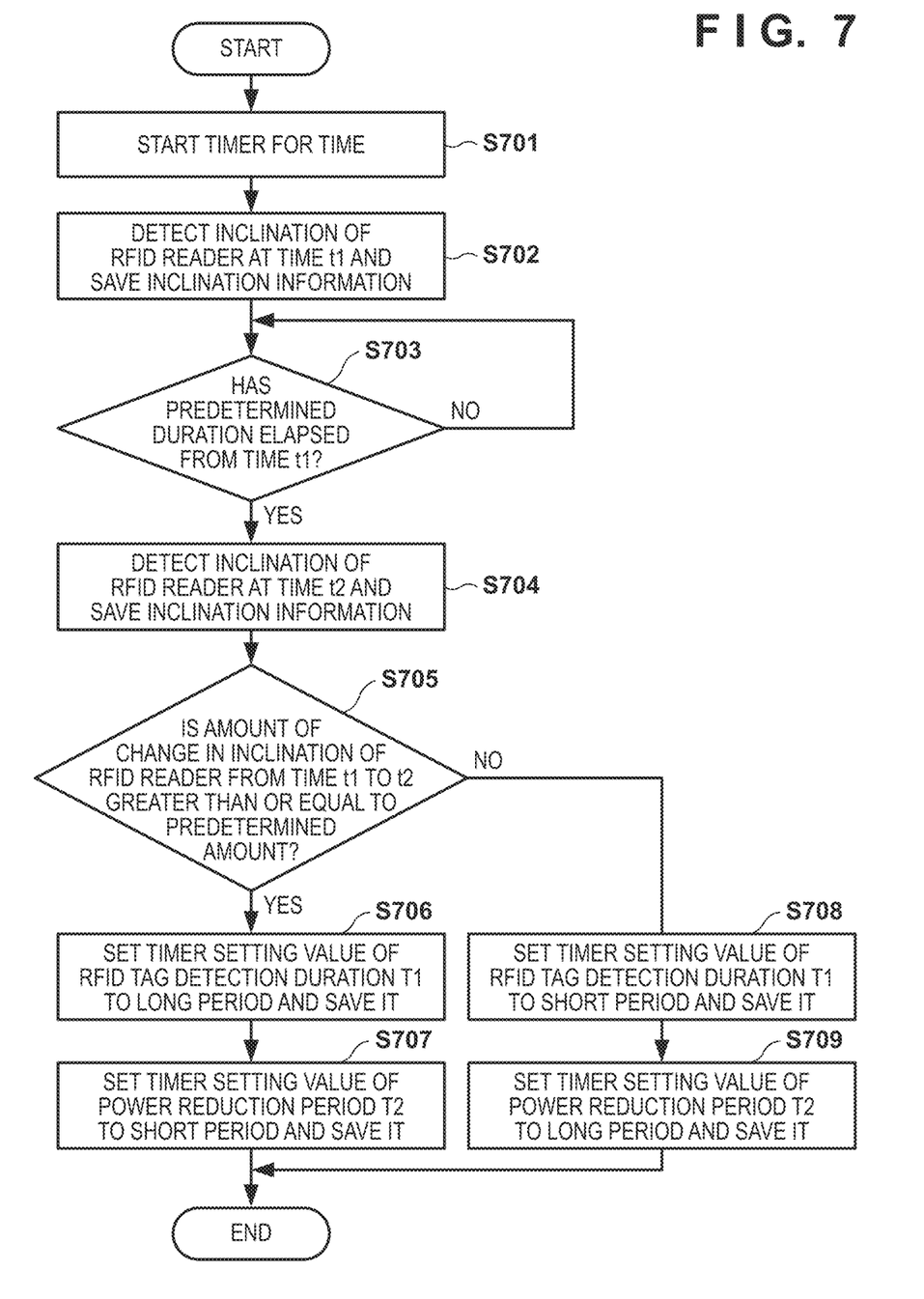
FIG. 7 is a diagram illustrating an exemplary flow of a process executed by the RFID reader.

FIG. 7 illustrates a second example of the flow of the procedure for setting the period T1 and the period T2. FIG. 7 illustrates an example of a procedure in which the RFID reader 100 sets the lengths of the period T1 and the period T2 in accordance with the amount of change in inclination. In the procedure of FIG. 7, the amount of change in inclination of the RFID reader 100 is used instead of the amount of change in position of the RFID reader 100 in the process of FIG. 6. Note that steps S701 and S703 are the same as steps S601 and S603, and steps S706 to S709 are the same as steps S606 to S609.

In steps S702 and S704, the computation unit 101 causes the movement/inclination amount detection sensor 104 to detect the inclination amount of the RFID reader 100 at a time t1 and time t2, respectively, and saves the detection result in the storage unit 102 as inclination information. Note that it is assumed that the inclination information at time t1 is expressed as ($\alpha1, \beta1, \gamma1$), and the inclination information at time t2 is expressed as ($\alpha2, \beta2, \gamma2$).

In step S705, the computation unit 101 reads out the inclination information at time t1 and time t2 from the storage unit 102, and determines whether or not the amount of change in inclination of the RFID reader 100 between time t1 and time t2 is equal to or greater than a predetermined amount. Note that the amount of change in inclination of the RFID reader 100 between time t1 and time t2 is calculated as:

Amount of change in inclination=$(\alpha 2-\alpha 1)^2+(\beta 2-\beta 1)^2+(\gamma 2-\gamma 1)^2$ Also, the amount of change in inclination of the RFID reader 100 from time t1 to time t2 may be calculated as the absolute value of the differences between the respective axes of rotation as follows.

$\Delta\alpha=|\alpha 2-\alpha 1|, \Delta\beta=|\beta 2-\beta 1|, \Delta\gamma=|\gamma 2-\gamma 1|$ When the amount of change in inclination is equal to or larger than the predetermined amount (YES in step S705), the computation unit 101 determines that the orientation of the RFID reader 100 is changing fast. In this instance, the computation unit 101 sets the timer setting value of the period T1 for detecting RFID tags 150 to a long period so as to avoid omission in the detection of RFID tags 150 that are present in the periphery of the RFID reader 100 (step S706). In addition, the computation unit 101 sets the timer setting value of the period T2, in which the power of the RFID reader 100 is reduced, to a short period (step S707). On the other hand, when the amount of change in inclination is less than the predetermined amount (NO in step S705), the computation unit 101 determines that the inclination of the RFID reader 100 is not changing fast. In this instance, even if the period T2 is lengthened, omission in the detection of RFID tags 150 is unlikely to occur, so the computation unit 101 sets the timer setting value of the period T1 for detecting RFID tags 150 to a short period (step S708). In addition, the computation unit 101 sets the timer setting value of the period T2, in which the power of the RFID reader 100 is reduced, to a long period (step S709).

It is assumed that the RFID reader 100 is mostly stopped when the amount of change in inclination is small. Therefore, when this amount of change in inclination is small, there is a low possibility that omission in the detection of RFID tags 150 will occur, so the RFID reader 100 reduces the strength of electromagnetic waves to be outputted, for example. According to this configuration, the RFID reader 100 can reduce the frequency at which the RFID tags 150 are read, and can sufficiently reduce consumed power. On the other hand, when the amount of change in inclination is large, it is assumed that the RFID reader 100 is rotating fast, and therefore, in order to prevent omission in the detection of RFID tags, the RFID reader 100 increases, for example, the strength of electromagnetic waves to be outputted. As a result, the RFID reader 100 can increase the frequency at which the RFID tags 150 are read, and can detect RFID tags 150 that are present in the periphery with high accuracy. In this manner, the RFID reader 100 can reduce the power consumed according to its status while detecting the RFID tags 150 in the periphery without omission.

Processing Example 3

Figure 8:
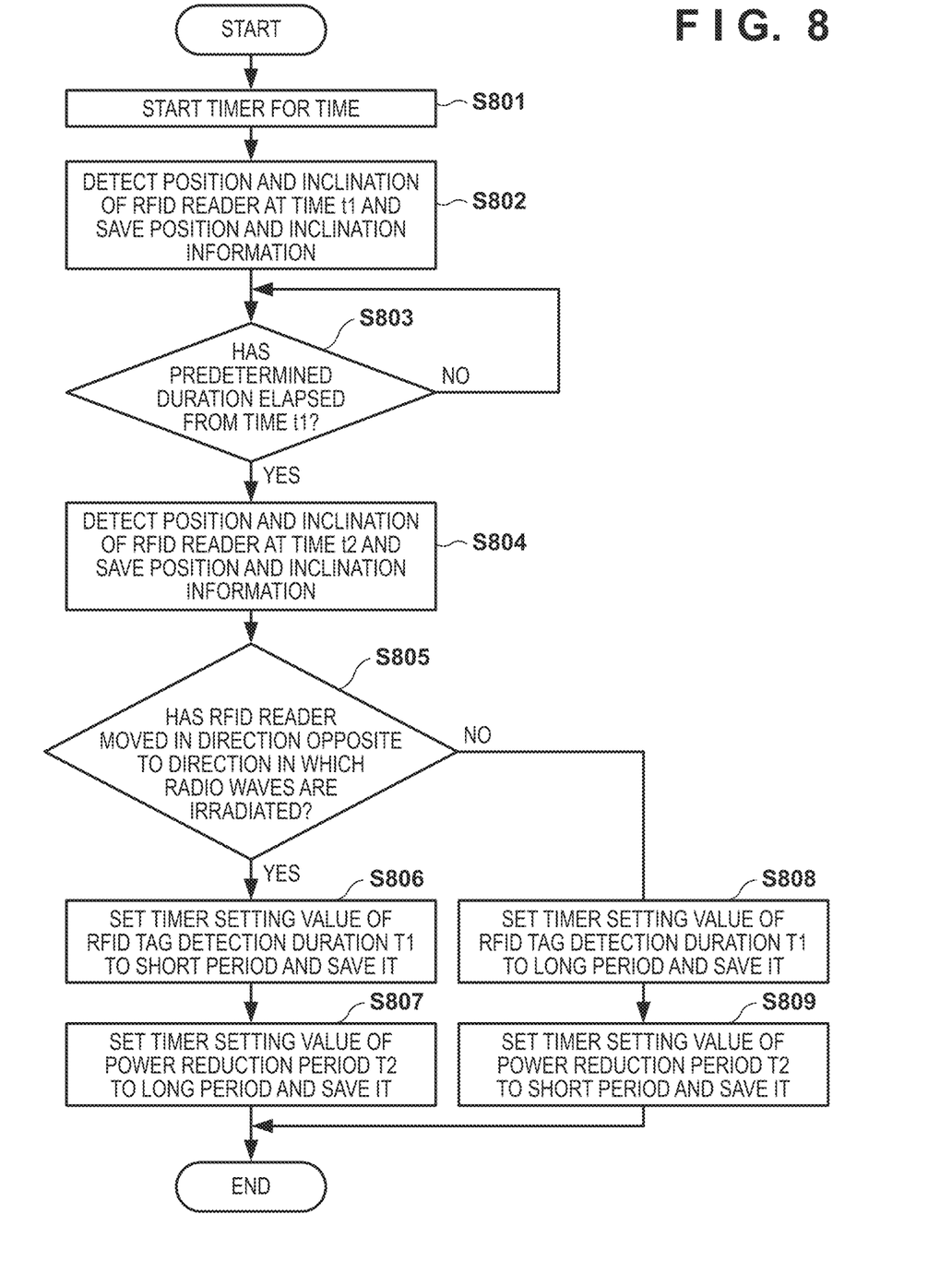
FIG. 8 is a diagram illustrating an exemplary flow of a process executed by the RFID reader.

FIG. 8 illustrates a third example of the flow of the procedure for setting the period T1 and the period T2. FIG. 8 illustrates an example of a procedure in which the RFID reader 100 determines a direction of movement in accordance with the amount of change in position and inclination and sets the lengths of the period T1 and the period T2 based on that direction of movement. Note that steps S801 and S803 are the same as those of steps S601/S701 and steps S603/S703.

In steps S802 and S804, the computation unit 101 causes the movement/inclination amount detection sensor 104 to detect the movement amount and the inclination amount of the RFID reader 100 at time t1 and time t2, respectively, and saves the detection result in the storage unit 102. Here, it is assumed that the position information at time t1 is expressed as (x1, y1, z1), the inclination information at time t1 is expressed as ($\alpha$1, $\beta$1, $\gamma$1), the position information at time t2 is expressed as (x2, y2, z2), and the inclination information at time t2 is expressed as ($\alpha$2, $\beta$2, $\gamma$2).

In step S805, the computation unit 101 reads out the position information and the inclination information at time t1 and time t2 from the storage unit 102. Then, based on the amount of change in these pieces of information, the computation unit 101 determines whether or not the RFID reader 100 has moved in a direction opposite (or a direction that is mostly opposite) to a direction in which radio waves are irradiated between the time t1 and time t2. For example, when the movement amount in the Y-axis direction, $\Delta y=y2-y1$, which is a movement in a direction opposite to a direction in which radio waves are irradiated from the RFID reader 100 is equal to or less than a negative predetermined value, the computation unit 101 may determine that there has been a movement in an opposite direction. Incidentally, for example, further based on the rotational amount of inclination, the computation unit 101 may determine the change in orientation of the RID reader 100 and may determine the radio wave irradiation direction in accordance with the state of change in orientation. For example, the computation unit 101 may decide the average values (($\alpha$1+$\alpha$2)/2, ($\beta$1+$\beta$2)/2, ($\gamma$1+$\gamma$2)/2) of the inclination information at time t1 and time t2 as the radio wave irradiation direction. For example, if, regarding the RFID reader 100, the rotational angle $\alpha$ about the Z-axis illustrated in FIG. 3A changes 90° in the period from time t1 to time t2, the direction obtained by adding 45° to $\alpha$1 may be the radio wave irradiation direction of the period from time t1 to time t2. Then, for example, when $\Delta x=x2-x1$ is equal to or less than a negative first predetermined value and $\Delta y=y2-y1$ is equal to or less than a negative second predetermined value, the computation unit 101 may determine that there has been a movement in a direction opposite to the radio wave irradiation direction. Note that the first predetermined value and the second predetermined value can be respectively decided according to the amount of change in inclination. Note that similarly, the computation unit 101 may determine the radio wave irradiation direction in accordance with a change in the rotation angle $\beta$ and the rotation angle $\gamma$, and decide a predetermined value related to X-axis, Y-axis, and the Z-axis corresponding to the opposite direction.

The computation unit 101, when the RFID reader 100 is determined to have moved in a direction opposite (or a direction substantially opposite) to the radio wave irradiation direction at time t1 (YES in step S805), sets the timer setting value of the period T1 for detecting the RFID tags 150 to a short period (step S806). In addition, the computation unit 101 sets the timer setting value of the period T2, in which the power of the RFID reader 100 is reduced, to a long period (step S807). On the other hand, the computation unit 101, when the RFID reader 100 is determined not to have moved in a direction opposite (or a direction substantially opposite) to the radio wave irradiation direction at time t1 (NO in step S805), sets the timer setting value of the period T1 for detecting the RFID tags 150 to a long period (step S808). In addition, the computation unit 101 sets the timer setting value of the period T2, in which the power of the RFID reader 100 is reduced, to a short period (step S809).

When a person wears the RFID reader 100 as illustrated in FIG. 2A, it can be assumed that the radio wave irradiation direction of the RFID reader 100 and the direction of movement of the person roughly coincide. In contrast, when the direction of movement of the person and the radio wave irradiation direction are in opposite directions, it is assumed that the radio wave irradiation direction of the RFID reader 100 is facing the direction of the person and is in an incorrect mounting state. When the radiation direction of radio waves of the RFID reader 100 is not appropriate, the RFID reader 100 cannot sufficiently achieve the capability to detect RFID tags 150. Therefore, by the control such as in FIG. 8, it is possible to reduce radio wave irradiation in a state in which detection capability cannot be sufficiently achieved. Note that when detecting that a state in which the radio wave radiation direction of the RFID reader 100 is determined to be inappropriate is continued, the computation unit 101 may notify the user of erroneous mounting by, for example, sounding a buzzer (not illustrated) of the RFID reader 100.

It should be noted that this is an example, and depending on the method by which the RFID reader 100 is mounted onto the moving body, for example, there are cases where it may be appropriate to mount such that the left and right of the RFID reader 100 with respect to the traveling direction of the moving body are covered. In this case, when the mounting state is inappropriate, the moving body may move to the left and right of the radio wave irradiation direction. Therefore, at the time of movement to a predetermined angular range other than the movement in the direction opposite to the radio wave irradiation direction, setting such that the length of the period T2 is lengthened may be performed. There may also be cases where a state in which it is appropriate for the moving body to move in the direction opposite of the radio wave irradiation direction is entered. Therefore, a range of direction with respect to the radio wave irradiation direction for determining to lengthen the length of the period T2 depending on the type of moving body and the like can be set.

Note that the computation unit 101 may execute the processes of FIGS. 6 to 8 described above in parallel. At this time, when different determination results are obtained in each process, the period T1 can be set to be the longest of the results obtained in each process. Also, the computation unit 101 repeatedly executes the processing. As a result, it becomes possible for the detection of RFID tags 150 by the RFID reader 100 to be appropriately executed without omission and to sufficiently reduce consumed power of the RFID reader 100 according to the status of the RFID reader 100. Note that the computation unit 101 may use the position information and the inclination information detected at time t2 in the previous process as the position information and the inclination information at time t1 of the next process in each of the processes described above. Thus, it is possible to omit the information collection process at t1, enabling to continue executing each process continuously.

Note that in the above-described processing example, the case where the setting values of the period T1 and the period T2 are set in two steps has been described, but control such that the ratio of the period length of the period T1 to the period T2 increases in proportion to, for example, the amount of change in movement amount and inclination or the like may be performed. For example, setting values may be set over a plurality of steps, such as three or more steps, such that the larger the amount of change in movement amount and inclination or the like, the longer the period T1 and the shorter the period T2, and the smaller the amount of change in movement amount and inclination or the like, the shorter the period T1 and the longer the period T2. In addition, the period T1 and the period T2 may be calculated each time using the magnitude of the amount of change in movement amount and inclination or the like as an argument, and control may be performed so that the length of the period T1 and the length of the period T2 can be adjusted in a stepless manner.

Further, in the above-described processing example, the strength of electromagnetic waves outputted in each of the period T1 and the period T2 has been described as being a fixed value, but control may be performed to weaken the strength of the electromagnetic waves outputted in inverse proportion to the amount of change in movement amount and inclination, for example. That is, setting values may be set over a plurality of steps, such as three or more steps, such that the larger the amount of change in movement amount and inclination, the stronger the strength of electromagnetic waves to be outputted, and the smaller the amount of change in movement amount and inclination, the weaker the strength of electromagnetic waves to be outputted. Further, regarding the strength of electromagnetic waves, control may be performed so as to be adjustable in a stepless manner.

As described above, by performing the above-described processes, the RFID tag 150 can be reliably detected while the consumed power is reduced in accordance with the change in the state of the RFID reader 100.

Note that in the embodiment described above, a case where RFID is used has been described, but the present invention is not limited thereto. For example, the process described above can be applied in any reader apparatus in which a small amount of power is radiated and a response is received from communication objects in the periphery.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-176923, filed Oct. 21, 2020, which is hereby incorporated by reference herein in its entirety.

What is claimed is:

1. A reader apparatus comprising:
one or more processors; and
one or more memories that store computer-readable instructions, which cause, when executed by the one or more processors, the reader apparatus to:
perform detection of a communication object by radiating radio waves and receiving a response;
determine a change in a state based on at least one of a position and an inclination of the reader apparatus; and
control power consumed in the reader apparatus by setting a length of a first period in which a reduction of power consumed in the detection is not performed, and a length of a second period in which a reduction of the power is performed, based on the change in the state,
wherein, in a case where an amount of the change in the state is a first amount or a second amount which is larger than the first amount, the first period and the second period are controlled to be alternately arranged such that the second period is started after an end of the first period, and the first period is started again after an end of the second period, and
wherein the reader apparatus sets the length of the second period to be longer than the length of the first period in the case where the amount of the change in the state is the first amount, and sets the length of the second period to be shorter than the length of the first period in the case where the amount of the change in the state is the second amount.

2. The reader apparatus according to claim 1, wherein the reader apparatus sets a setting value of the length of the second period to a first value in a case where an amount of change in the position of the reader apparatus does not exceed a predetermined value, and sets the setting value of the length of the second period to a second value, which is shorter than the first value, in a case where an amount of change in the position of the reader apparatus exceeds the predetermined value.

3. The reader apparatus according to claim 1, wherein the reader apparatus sets a setting value of the length of the first period to a third value in a case where an amount of change in the position of the reader apparatus does not exceed a predetermined value, and sets the setting value of the length of the first period to a fourth value, which is longer than the third value, in a case where an amount of change in the position of the reader apparatus exceeds the predetermined value.

4. The reader apparatus according to claim 1, wherein the reader apparatus sets a setting value of the length of the second period to a first value in a case where an amount of change in the inclination of the reader apparatus does not exceed a predetermined value, and sets the setting value of the length of the second period to a second value, which is shorter than the first value, in a case where an amount of change in the inclination of the reader apparatus exceeds the predetermined value.

5. The reader apparatus according to claim 1, wherein the reader apparatus sets a setting value of the length of the first period to a third value in a case where an amount of change in the inclination of the reader apparatus does not exceed a predetermined value, and sets the setting value of the length of the first period to a fourth value, which is longer than the third value, in a case where an amount of change in the inclination of the reader apparatus exceeds the predetermined value.

6. The reader apparatus according to claim 1, wherein the reader apparatus sets a setting value of the length of the second period to a first value in a case where the reader apparatus moves to a predetermined range with respect to a direction in which the radio waves are radiated, and sets the setting value of the length of the second period to a second value, which is shorter than the first value, in a case where the reader apparatus does not move to the predetermined range based on at least one of the position and the inclination of the reader apparatus.

7. The reader apparatus according to claim 1, wherein the reader apparatus sets a setting value of the length of the first period to a third value in a case where the reader apparatus moves to a predetermined range with respect to a direction in which the radio waves are radiated, and sets the setting value of the length of the first period to a fourth value, which is longer than the third value, in a case where the reader apparatus does not move to the predetermined range based on at least one of the position and the inclination of the reader apparatus.

8. The reader apparatus according to claim 1, wherein the reader apparatus radiates, in the second period, the radio waves at a strength that is smaller than that of the first period.

9. The reader apparatus according to claim 1, wherein the reader apparatus does not radiate the radio waves in the second period.

10. The reader apparatus according to claim 1, wherein the reader apparatus performs the setting in the first period and does not perform the setting in the second period.

11. The reader apparatus according to claim 1, wherein the computer-readable instructions cause, when executed by the one or more processors, the reader apparatus to transmit information related to the detected communication object to another apparatus different from the reader apparatus, and
the reader apparatus stops an operation of the transmission in the second period.

12. The reader apparatus according to claim 1, wherein the reader apparatus is an RFID reader, and the communication object is an RFID tag.

13. A control method executed by a reader apparatus operable to perform detection of a communication object by radiating radio waves and receiving a response, the method comprising:
determining a change in a state based on at least one of a position and an inclination of the reader apparatus; and
controlling power consumed in the reader apparatus by setting a length of a first period in which a reduction of power consumed in the detection of the communication object is not performed, and a length of a second period in which a reduction of the power is performed, based on the change in the state,
wherein, in a case where an amount of the change in the state is a first amount or a second amount which is larger than the first amount, the first period and the second period are controlled to be alternately arranged such that the second period is started after an end of the first period, and the first period is started again after an end of the second period, and wherein the reader apparatus sets the length of the second period to be longer than the length of the first period in the case where the amount of the change in the state is the first amount, and sets the length of the second period to be shorter than the length of the first period in the case where the amount of the change in the state is the second amount.

14. A non-transitory computer-readable storage medium that stores a computer program for causing a computer included in a reader apparatus to:

perform detection of a communication object by radiating radio waves and receiving a response;

determine a change in a state based on at least one of a position and an inclination of the reader apparatus; and control power consumed in the reader apparatus by setting a length of a first period in which a reduction of power consumed in the detection is not performed, and a length of a second period in which a reduction of the power is performed, based on the change in the state, wherein, in a case where an amount of the change in the state is a first amount or a second amount which is larger than the first amount, the first period and the second period are controlled to be alternately arranged such that the second period is started after an end of the first period, and the first period is started again after an end of the second period, and wherein the reader apparatus sets the length of the second period to be longer than the length of the first period in the case where the amount of the change in the state is the first amount, and sets the length of the second period to be shorter than the length of the first period in the case where the amount of the change in the state is the second amount.

\* \* \* \* \*